United States Patent
Elliott et al.

(10) Patent No.: US 9,010,776 B2
(45) Date of Patent: Apr. 21, 2015

(54) SCOOTER

(71) Applicants: Jon Elliott, San Diego, CA (US); David Yin, Taipei (TW)

(72) Inventors: Jon Elliott, San Diego, CA (US); David Yin, Taipei (TW)

(*) Notice: Subject to any disclaimer, the term of this patent is extended or adjusted under 35 U.S.C. 154(b) by 0 days.

(21) Appl. No.: 13/942,903

(22) Filed: Jul. 16, 2013

(65) Prior Publication Data

US 2014/0159330 A1 Jun. 12, 2014

Related U.S. Application Data

(60) Provisional application No. 61/672,186, filed on Jul. 16, 2012, provisional application No. 61/759,708, filed on Feb. 1, 2013.

(51) Int. Cl.
*B62M 1/00* (2010.01)
*B62K 3/00* (2006.01)
*B62K 19/14* (2006.01)

(52) U.S. Cl.
CPC ............... *B62K 3/002* (2013.01); *B62K 19/14* (2013.01)

(58) Field of Classification Search
USPC ............... 280/14.21, 87.01, 87.021, 87.041, 280/87.042, 87.05
See application file for complete search history.

(56) References Cited

U.S. PATENT DOCUMENTS

| | | | |
|---|---|---|---|
| 2,051,762 A * | 8/1936 | Vincent | 280/87.041 |
| 4,161,326 A * | 7/1979 | Gaber | 280/87.042 |
| 6,168,175 B1 | 1/2001 | Lan | |
| D437,363 S | 2/2001 | Chen et al. | |
| D444,511 S | 7/2001 | Shih | |
| D451,154 S | 11/2001 | Navarro | |
| D454,599 S | 3/2002 | Chen et al. | |
| 6,367,828 B1 * | 4/2002 | Mandic | 280/87.05 |
| D457,574 S | 5/2002 | Chen et al. | |
| D459,762 S | 7/2002 | Chen et al. | |
| D476,041 S | 6/2003 | Phillips | |
| D486,532 S | 2/2004 | Christianson | |
| D531,679 S | 11/2006 | Chen et al. | |
| 8,528,921 B2 * | 9/2013 | Broussard | 280/87.05 |
| 2002/0030339 A1 * | 3/2002 | Powers | 280/87.041 |
| 2005/0012289 A1 | 1/2005 | Wang et al. | |
| 2005/0212228 A1 * | 9/2005 | Best | 280/14.21 |
| 2009/0134590 A1 * | 5/2009 | Largueze et al. | 280/14.21 |
| 2010/0127468 A1 * | 5/2010 | Park | 280/87.042 |
| 2013/0049334 A1 * | 2/2013 | Powers et al. | 280/655.1 |

* cited by examiner

*Primary Examiner* — Frank Vanaman
(74) *Attorney, Agent, or Firm* — Robert L. Shaver; Dykas & Shaver

(57) ABSTRACT

A two wheel scooter made of replaceable and interchangeable parts, with metal wheel brackets at either end of a deck, connected by a spine piece, with the spine piece recessed into a wooden scooter deck.

11 Claims, 3 Drawing Sheets

SCOOTER

PRIORITY/CROSS-REFERENCE TO RELATED APPLICATIONS

This application claims the benefit of U.S. Provisional Application No. 61/672,186, filed Jul. 16, 2012, and U.S. Provisional Application No. 61/759,708, filed Feb. 1, 2013, the disclosure of which is incorporated by reference.

TECHNICAL FIELD

The presently disclosed and claimed inventive concept(s) generally relates to a scooter device, and more particularly to foot powered two wheeled scooter with a steering wheel.

BACKGROUND

Scooters are a means of transportation, sport, and a fun toy for people of all ages. One type of scooter has a deck with a wheel at each end of the deck. A user has one foot on the deck, and pushes off with the other foot. Once coasting, the user can bring both feet onto the deck and coast for a distance. The most popular brand of scooter in recent years has had a mono frame, meaning the frame is one solid piece of metal, to which the steering mechanism and wheels are attached. A desirable option is to have a scooter made of modular pieces, so the scooter can be modified to the specific performance or appearance needs of a particular user.

SUMMARY OF THE DISCLOSURE

The disclosed technology is a two-wheeled scooter. The scooter has a deck, where the rider places his feet. On either end of the deck there is a wheel. The scooter deck is generally elongated and rectangular and has a longitudinal axis that runs from the front wheel to the rear wheel. It has a top surface and a bottom surface, and it has U-shaped cutouts at either end of the deck, in which the wheels are placed.

At the rear end of the deck in the U-shaped cutout is a rear wheel bracket. This is preferably a metallic structure which has two plates which are generally horizontal or co-planar with the top and bottom surface of the deck. The two plates are designated the top bracket plate and the bottom bracket plate. The front wheel bracket is constructed in the same manner as the rear wheel bracket, and also has the equivalent of these two plates. The plates are connected to each other by vertical side walls, called the left bracket side wall and the right bracket side wall. These are parallel to the long axis of the deck, and normal or perpendicular to the top surface of the deck. The rear wheel bracket has passages for placement of a rear wheel axis, on which the rear wheel is mounted. The deck is designed so that when the rear wheel is installed, part of the rear wheel is above the deck and part of the rear wheel is below the deck. Also is attached to the rear wheel bracket is a rear wheel fender, which is flexible and can be pressed into contact with the rear wheel, and can act as a brake. The rear wheel fender is attached on the top side of the deck.

The front wheel bracket is similar in some ways to the rear wheel bracket. It is similar in that it has a top bracket plate and a bottom bracket plate, which are positioned from each other with a left bracket side wall and a right bracket side wall. However, the outline of the plates of the front bracket are different than the shape of the plates in the rear bracket. Also, in the front wheel bracket the front wheel is not positioned within the bracket itself. In the front wheel bracket a stem tube is attached to the top bracket plate. The stem tube extends at approximately a 45 degree angle from the top bracket plate, and thus extends out from the top surface of the deck. On the non-attached end of the stem tube a headset is attached. The headset is a cylindrical tube, which houses bearings at either end to facilitate the turning of the front wheel. The headset interfits with a front fork. The front fork is generally equivalent to the front fork of a bicycle in which it has a forked end for securing the front wheel axis, with the front wheel being positioned on the front wheel axle. The front fork also has a cylindrical end which goes through the headset and extends out of the headset.

Attached to the portion of the front fork which extends above the headset is a steering tube. This is generally a cylindrical tube which has a clamp on its lower end which attaches securely to the cylindrical end of the front fork. At the other end of the steering tube is mounted a handlebar which can be rigidly attached to the steering tube, such as by welding, or can be locked in place by a releasable clamp similar to that found in bicycles.

The scooter deck includes a recessed band which runs from the front wheel bracket to the rear wheel bracket. The recessed band is made for placement of a spine piece, which would typically be a rectangular metal bar which is bolted to the rear wheel bracket and to the front wheel bracket. This interfitting of the recessed band and the spine provides reinforcement and structural reinforcement to the whole scooter. Preferably, the spine piece includes two protruding ridges or rails on the underside, which interfit with grooves in the deck, in the recessed band. These structures provide additional reinforcement and structure to the scooter deck.

One of the important features of this scooter is that all of these parts come apart and can be customized or configured to the specific needs of a rider of a scooter. Thus the deck can be changed out for one that is more flexible, has different graphics, is made of different materials, is lighter or heavier, etc. Similarly, all the other components are easily changed out. This makes this design of scooter customizable for the specific performance requirements of a rider.

The recessed band and spine piece are preferably mounted on the top surface of the scooter deck, but could function as well if they were mounted on the bottom surface of the scooter deck. When mounted on the top surface of the scooter deck, it is preferable that the spine piece be flush with the top surface of the deck. It can also be covered or embedded by a grip enhancement surface, such as ribs, a rubberized surface, or a fan paper type surface. Preferably, the scooter deck on either side of the spine piece are angled toward the spine piece, forming a concave top surface of the deck. This provides improved feel and control to the user. The deck also has beveled side edges, to that the top deck surface is slightly wider than the borrom deck surface. The beveled sides provide optimum control from the top surface, with the deck being as light as possible. Since the deck is removable and replaceable from the other parts, a user can select different decks for the material he prefers, for graphics, for surface coverings, color, and for deck shape, such as the amount of beveling.

The scooter deck has recessed areas around the U-shaped cutouts at either end. The recessed areas can be on the top or bottom, and are preferably on both the top and the bottom and fit the profile of the top bracket plates and the bottom bracket plates at the front and the rear. This configuration allows the rear wheel bracket and front wheel bracket to slide into place in the deck and be flush with the surface of the deck.

In a preferred embodiment of the scooter, the scooter deck has two vertical slots in the U-shape cutout in the front of the scooter. These correspond with the left bracket side wall and the right bracket side wall, and thus those side walls extend partially into the deck into a tight fitting slot. This adds structural connection between the front wheel bracket and the scooter deck. The front wheel bracket has bolt holes which allow it to be secured by bolts to the scooter deck with a bolt hole on either side of the U-shaped cutout, and with two bolt holes which pass through the spine piece and allows the spine piece, the deck, and the front wheel bracket to be securely bolted together. The rear wheel bracket is similarly bolted and connected to the deck and the back end of the spine piece.

One embodiment of the scooter includes one or more concave grooves in the surface of the deck. These are provided to allow the user to more easily slide along a rail or structural corner with the scooter centered on the rail by the use of the concave grooves. These are approximately one inch in diameter and approximately eight inches long, and in one embodiment, form a X or a cross on the bottom surface of the deck. These grooves are at an angle of the longitudinal axis of the scooter, with the angle being approximately 50 to 70 degrees with 60 degrees being an optimal angle.

DETAILED DESCRIPTION OF THE EXEMPLARY EMBODIMENTS

Figure 1:
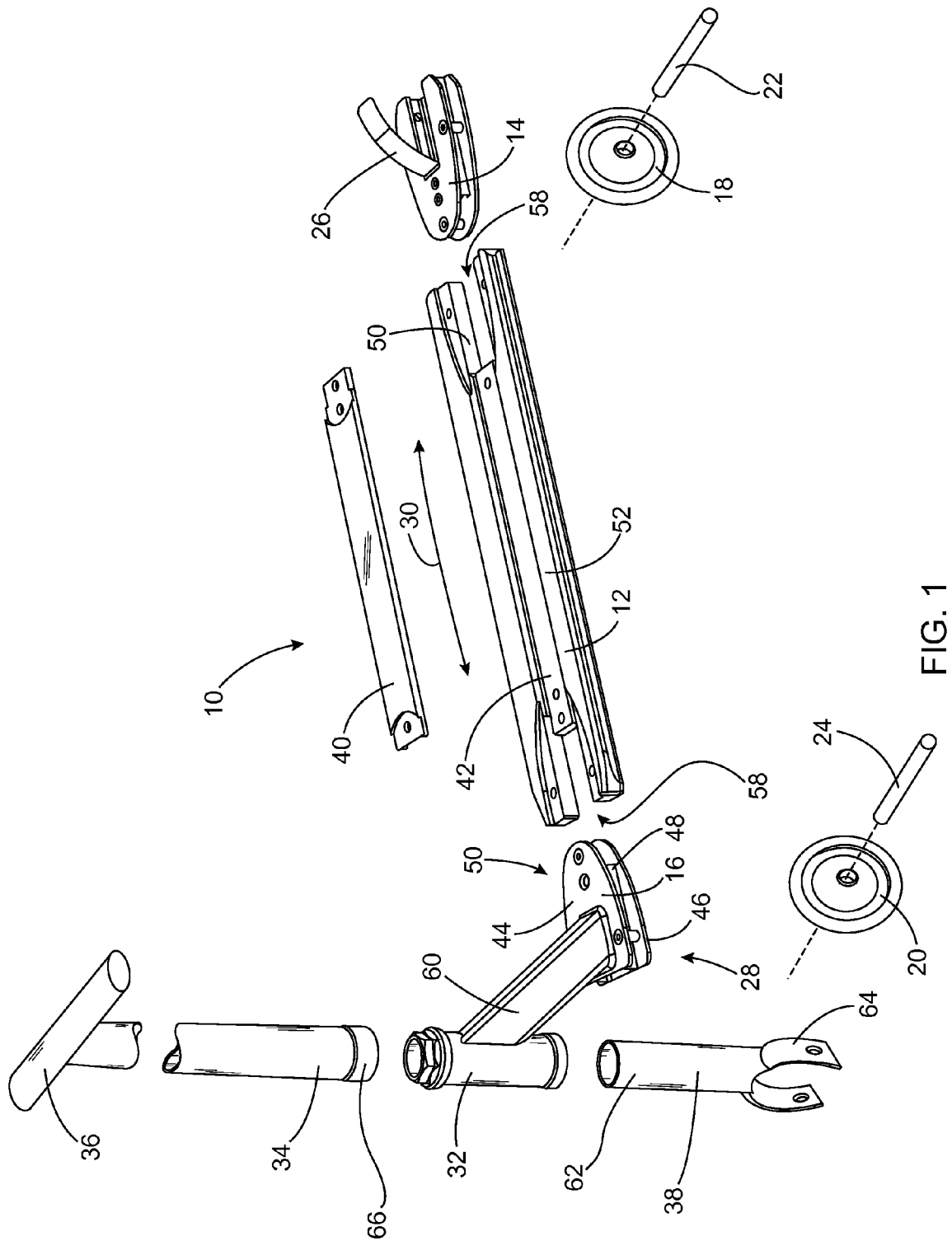
FIG. 1 is an exploded perspective view of the top surface of a scooter of the disclosed technology.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
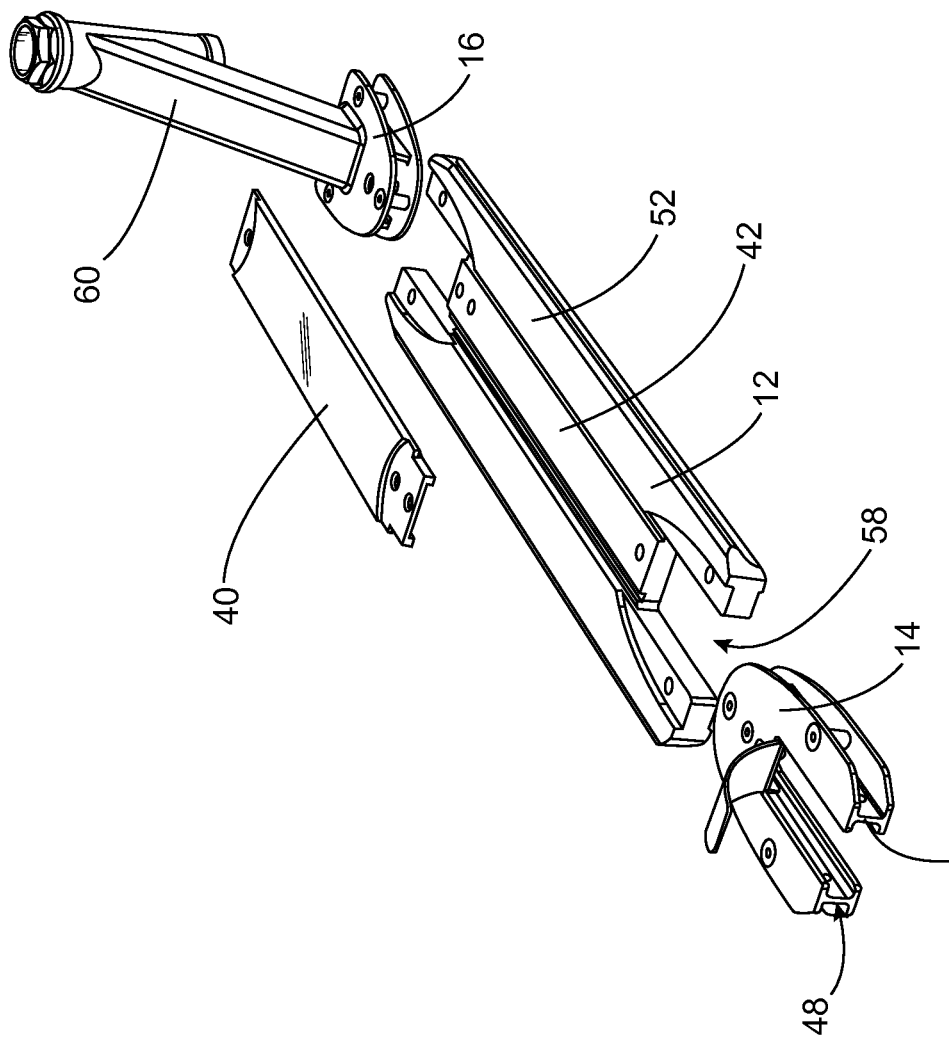
FIG. 2 is an exploded perspective view of the top surface of a scooter of the disclosed technology.
Figure 3:
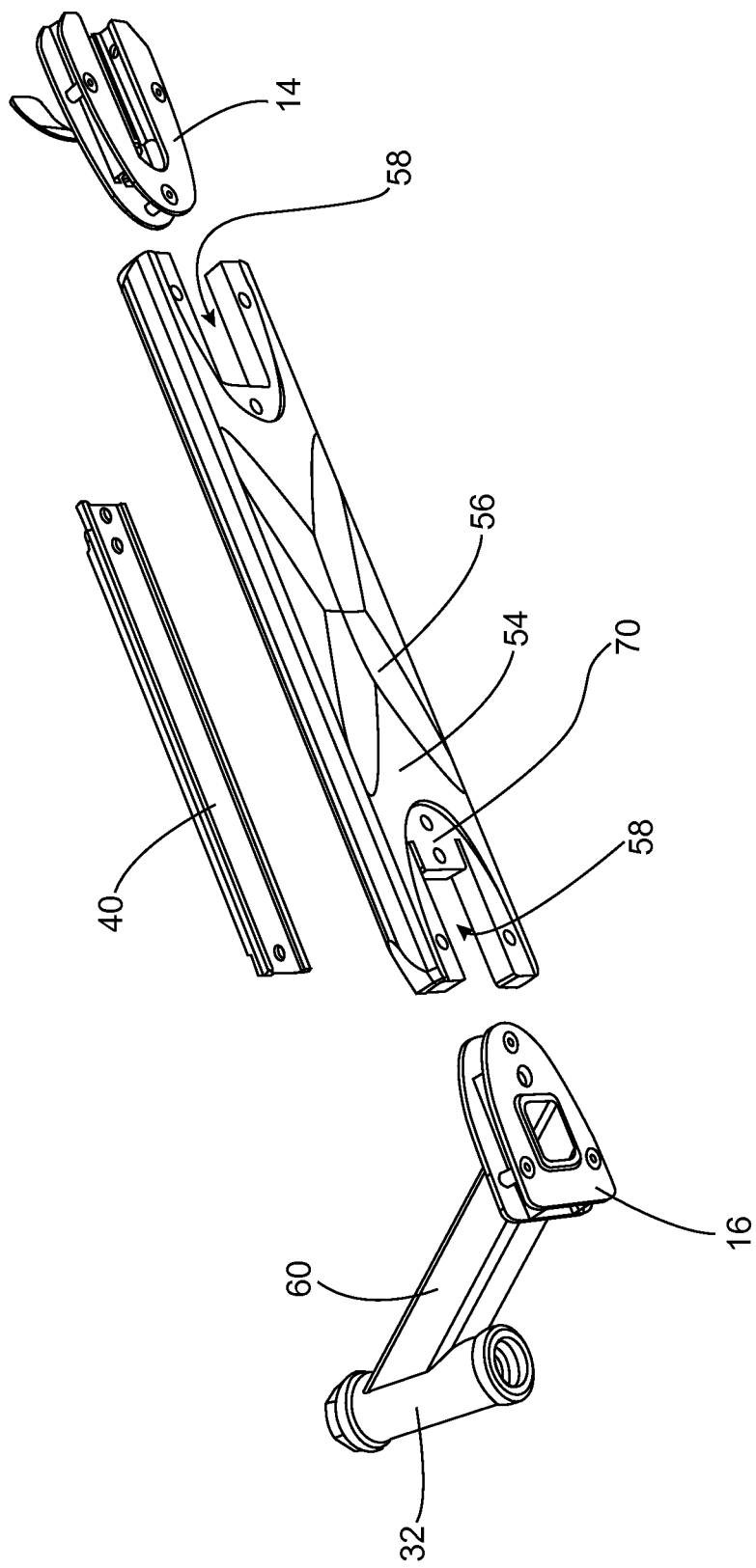
FIG. 3 is an exploded perspective view of the bottom surface of a scooter of the disclosed technology.

A preferred embodiment of the disclosed technology is shown in FIGS. 1 through 3. FIG. 1 shows a scooter of the disclosed technology as an exploded view of the top surface.

The disclosed technology is a steerable two wheeled scooter. The scooter has a scooter deck 12 with a rear wheel bracket 14 mounted in a cutout 58 in the tail of the scooter deck 12. A rear wheel axle 22 passes through the center of the rear wheel 18 and is held in place between the sides 48 and 50 of the rear wheel bracket 14 in the cutout 58 in the scooter deck 12. Mounted in this configuration, part of the rear wheel 18 extends below the bottom surface 54 of the scooter deck 12 and part of the wheel extends above the top surface 52 of the scooter deck. There is also preferably a curved wheel-protective fender 26 attached to the top surface 52 of the scooter deck 12, which can also serve as a friction brake on the rear wheel 18.

The device includes a front wheel 20, and a front wheel assembly 28. The front wheel assembly 28 includes a front wheel bracket 16 which is attached to the front end of the scooter deck 12. The front wheel bracket 16 is similar to the rear wheel bracket 14, in that it is formed of a top bracket plate 44 and a bottom bracket plate 46, both of which are co-planar with the upper 52 and lower 54 surfaces of the deck 12 when assembled. These plates held are in a spaced apart position from each other by a left 48 and a right 50 bracket sidewalls.

The rear wheel bracket 14 has the same parts except for the stem tube, headset, fork, and steering tube and handlebars.

From the top plate of the front wheel bracket 16, a stem tube 60 is attached and extends upward from the top plate 44 of the front wheel bracket 16 of the scooter 10 at about a 45 degree angle. Attached at the second end of the stem tube 60 is a headset 32 which is generally cylindrical and generally vertical to the plane of the deck 12. The front wheel assembly 28 includes a front fork 38 with a cylindrical end 62 and a fork end 64, with the cylindrical end 62 extending through the headset 32, and the fork end 64 attaching to the ends of the front wheel axle 24 which passes through the front wheel 20. The cylindrical end 62 of the front fork 38 passes through the headset 32 and is secured to a steering tube 34 by conventional means. The steering tube 34 has handlebars 36 at a second end for steering the front wheel 20. The steering tube 34 includes a clamp 66 which allows the steering tube 34 to be secured to the cylindrical end 62 of the fork, which passes through the headset 32.

The deck 12 of the scooter is preferably made of a lightweight material, with a number of materials being suitable for this purpose. Suitable materials include wood, and specifically laminated bamboo, composites of laminated wood, as well as materials such as plywood, aluminum, carbon fibers encased in resin, fiberglass, steel or titanium.

The rear wheel 18 is mounted in a rear wheel bracket 14 which defines a cutout or U-shaped slot 58, with passages for the rear wheel axle 22 to pass from one side of the cutout 58 to the other. The rear wheel bracket 14 preferably has a top bracket plate 44 and a bottom bracket plate 46, and the same sidewall configuration as the front wheel bracket 16 for holding the two plates apart. The scooter body has a recessed region around the cutouts, which conforms to the profile of the front and rear brackets top and bottom plates. The brackets are flush with the top and bottom surface of the deck, and sandwich a portion of the deck between the top and bottom plates, for added strength of the connection between the deck and the brackets.

The front and rear brackets are connected by a metal deck spine piece 40, which fits in a recessed band 42 on the top of the deck. The deck spine 40 adds strength and impact resistance to the scooter deck 12.

The front and rear brackets each have a pair of vertical sidewalls 48 and 50, which are parallel with the long axis of the deck 12, and which are normal to the top surface 52 of the deck. These sidewalls fit into vertical slots on either side of the recessed band 42 in the deck 12, and enhance the connection of the front and rear brackets to the deck. FIG. 2 is a view of the rear and upper portion of the scooter deck. FIG. 3 is a view of the bottom side of the scooter deck 12. The bottom side of the scooter body can include a number of concave grooves called grinding grooves 56 which are arranged at various angles to the longitudinal axis of the scooter body. For instance, the scooter may have two diagonal grooves which cross roughly in the middle of the scooter body and the scooter may also have one or more additional grooves which compliment the first two grooves. These grooves are generally rounded in cross-section and provide a guide surface for when the scooter is used to slide along a bar or ridge such as along handrail or the edges of structures such as curbs or rails. One preferred configuration is to have two diagonal grooves 56 which cross roughly in the center and one groove which is normal to the longitudinal axis of the scooter body.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

The invention claimed is:

1. A two wheeled scooter comprising:
   a scooter deck with a front and a rear end, and with a longitudinal axis and a top surface and a bottom surface, with U-shaped cutouts on each end of said deck;
   a rear wheel bracket mounted to said scooter deck in said cut out in the rear end of said deck, said rear wheel bracket comprising a top bracket plate and a bottom bracket plate both plates co-planar with the respective top and bottom surface of said scooter deck, with said plates held in a spaced apart position by left and right bracket sidewalls normal to said top surface of said deck, and parallel to said longitudinal axis, with said rear wheel bracket configured for attachment of a rear wheel axle and a rear wheel;
   a front wheel bracket mounted to said scooter deck in said cutout in the front end of said scooter deck, said front wheel bracket comprising a top bracket plate and a bottom bracket plate, both plates co-planar with the respective top and bottom surface of said scooter deck, with said plates held in a spaced apart position by left and right bracket sidewalls normal to said top surface of said deck, and parallel to said longitudinal axis, with said front bracket having an attached stem tube attached at an angle to said top plate, with said stem tube attached to a headset, with said headset configured to accept a front fork, and a steering tube attached to said front fork on an opposite end of said headset, with said front fork configured for attachment of a front wheel and a front wheel axle;
   a spine piece attached to and removable from said front wheel bracket and to said rear wheel bracket, configured to attach to said deck; and
   said steering tube attachable to said front fork when said front fork is extended through said headset, with handlebars on an end of said steering tube opposite said headset;
   wherein said deck, wheel brackets, spine, front forks and steering tubes are removable for customization by a user.

2. The two wheeled scooter of claim 1 which further comprised a recessed band in said top surface of said scooter deck which extends from said rear wheel bracket to said front wheel bracket, and with said spine piece mounted in said recessed band flush with said top surface of said deck.

3. The two wheeled scooter of claim 1 in which said scooter deck further comprises recessed areas on the top surface of said deck, around said front and rear U-shaped cutouts, which correspond to a shape of said top plates of said front and rear wheel brackets, so that said top plates of said wheel brackets are flush with said top surface of said scooter deck.

4. The two wheeled scooter of claim 1 in which said scooter deck further comprises recessed areas on the bottom surface around said front and rear U-shaped cutouts, which corresponds to a shape of said bottom plates of said front and rear wheel brackets, so that said bottom plates of said wheel brackets are flush with said bottom surface of said scooter deck.

5. The two wheeled scooter of claim 1 in which said scooter deck further comprises a plurality of concave grooves in the deck bottom surface for use when sliding said scooter over rails and other features.

6. The two wheeled scooter of claim 5 in which said concave grooves in said deck bottom surface are at an angle of approximately 50 to 70 degrees to said longitudinal axis of said deck.

7. The two wheeled scooter of claim 6 in which said concave grooves in said deck bottom surface comprise two grooves which are at opposite angles and which cross each other on said deck bottom surface.

8. A two wheeled scooter comprising:
   a scooter deck with a front and a rear end, and with a longitudinal axis and a top surface and a bottom surface, with U-shaped cutouts on each end of said deck;
   a rear wheel bracket mounted to said scooter deck in said cut out in the rear end of said deck, said rear wheel bracket comprising a top bracket plate and a bottom bracket plate both plates co-planar with the respective top and bottom surface of said scooter deck, with said plates held in a spaced apart position by left and right bracket sidewalls normal to said top surface of said deck, and parallel to said longitudinal axis, with said rear wheel bracket configured for attachment of a rear wheel axle and a rear wheel;
   a front wheel bracket mounted to said scooter deck in said cutout in the front end of said scooter deck, said front wheel bracket comprising a top bracket plate and a bottom bracket plate, both plates co-planar with the top and bottom surface of said scooter deck, with said plates held in a spaced apart position by left and right bracket sidewalls normal to said top surface of said deck, and parallel to said longitudinal axis, with said front bracket having an attached stem tube attached at an angle to said top plate, with said stem tube attached to a headset, with said headset configured to accept a front fork, and a steering tube attached to said front fork on an opposite end of said headset, with said front fork configured for attachment of a front wheel and a front wheel axle;
   a spine piece attached to and removable from said front wheel bracket and to said rear wheel bracket, configured to attach to said deck, said deck having a recessed band in said top surface of said scooter deck which extends from said rear wheel bracket to said front wheel bracket, and with said spine piece mounted in said recessed band flush with said top surface of said deck; and
   said steering tube attachable to said front fork when said front fork is extended through said headset, with handlebars on an end of said steering tube opposite said headset;

with said deck comprising recessed areas on the top surface of said deck, around said front and rear U-shaped cutouts, which correspond to a shape of said top plates of said front and rear wheel brackets, so that said top plates of said wheel brackets are flush with said top surface of said scooter deck; and with said deck further comprising recessed areas on the deck bottom surface around said front and rear U-shaped cutouts, which corresponds to a shape of said bottom plates of said front and rear wheel brackets, so that said top plates of said wheel brackets are flush with said bottom surface of said scooter deck;

wherein said deck, wheel brackets, spine, front fork and steering tubes are removable for customization by a user.

9. The two wheeled scooter of claim 8 in which said scooter deck further comprises a plurality of concave grooves in the deck bottom surface for use when sliding said scooter over rails and other features.

10. The two wheeled scooter of claim 9 in which said concave grooves in said deck bottom surface are at an angle of approximately 50 to 70 degrees to said longitudinal axis of said deck.

11. The two wheeled scooter of claim 10 in which said concave grooves in said deck bottom surface comprise two grooves which are at opposite angles and which cross each other on said deck bottom surface.

* * * * *